United States Patent [19]
Young et al.

[11] Patent Number: 5,684,490
[45] Date of Patent: Nov. 4, 1997

[54] HIGHWAY VEHICLE GUIDANCE SYSTEM

[75] Inventors: Jonathan D. Young, Worthington; Lee W. Henderson, Columbus, both of Ohio

[73] Assignee: The Ohio State University, Columbus, Ohio

[21] Appl. No.: 396,575

[22] Filed: Mar. 1, 1995

[51] Int. Cl.⁶ ............................................. G01S 13/93
[52] U.S. Cl. ........................... 342/70; 342/6; 404/14
[58] Field of Search ........................ 342/70–72, 5–8, 342/10, 11, 33, 34, 456, 6; 901/1; 404/12, 13, 14

[56] References Cited

U.S. PATENT DOCUMENTS

| | | | |
|---|---|---|---|
| 2,840,819 | 6/1958 | McClellan | 342/6 |
| 2,996,137 | 8/1961 | Yaohan Chu et al. | 180/168 |
| 3,680,111 | 7/1972 | Killion et al. | 342/351 |
| 3,729,737 | 4/1973 | Asam | 342/33 |
| 4,361,911 | 11/1982 | Buser et al. | 455/605 |
| 4,421,347 | 12/1980 | Albanese et al. | 342/16 |
| 4,713,663 | 12/1987 | Drabowitch et al. | 342/70 |
| 4,786,164 | 11/1988 | Kawata | 356/4 |
| 4,925,335 | 5/1990 | Eigenmann | 404/14 |
| 4,928,130 | 5/1990 | Pfabe et al. | 342/9 |
| 5,313,262 | 5/1994 | Leonard | 356/5 |
| 5,347,456 | 9/1994 | Zhang et al. | 364/424.02 |
| 5,386,426 | 1/1995 | Stephens | 372/20 |
| 5,390,118 | 2/1995 | Margolis et al. | 364/424.02 |
| 5,402,129 | 3/1995 | Gellner et al. | 342/70 |

OTHER PUBLICATIONS

R. J. Mayhan and R. A. Bishel, "A Two–Frequency Radar for Vehicle Automatic Lateral Control", *IEEE Trans. Veh. Technol.*, vol. VT–31, No. 1, Feb. 1982, pp. 32–39.

*Primary Examiner*—Michael J. Carone
*Assistant Examiner*—Christopher K. Montgomery
*Attorney, Agent, or Firm*—Frank H. Foster; Kremblas, Foster, Millard & Pollick

[57] ABSTRACT

A radar highway motor vehicle guidance apparatus for guiding a land vehicle along a roadway using a forward looking, lateral position sensing, monopulse tracking radar guidance apparatus which transmits radar pulses forward of the vehicle. The pulses are reflected back to the vehicle by a stripe distributed along the roadway. The stripe is a frequency selective surface which generates retro-reflective grating lobes at an operating frequency of the tracking radar. Operating the radar at two frequencies allows the radar to look at regions spaced at two different distances from the front of the vehicle. Highway related information may be encoded in the frequency selective surface by variations in the shape or dimensions of the frequency selective stripe morphology in order to modulate the reflected signal with highway information which is then also detected at the radar receiver. Target discrimination is enhanced by using pseudo random codes and matching antenna polarization with stripe polarization.

13 Claims, 7 Drawing Sheets

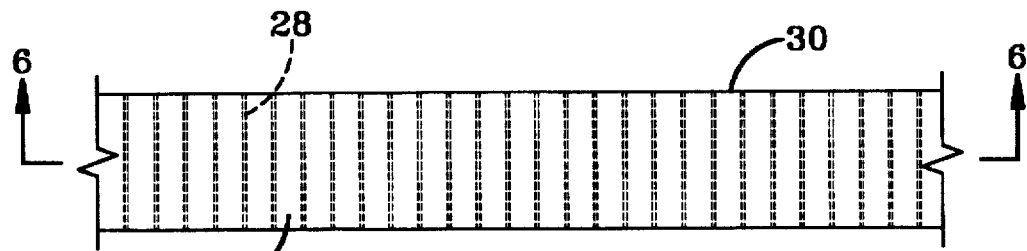
FIG-5
FIG-6
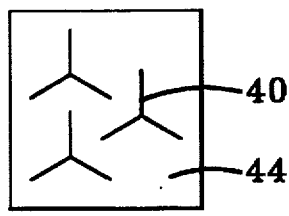
FIG-7
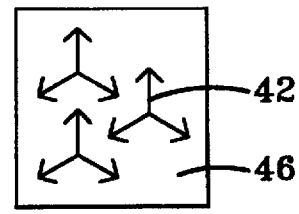
FIG-8
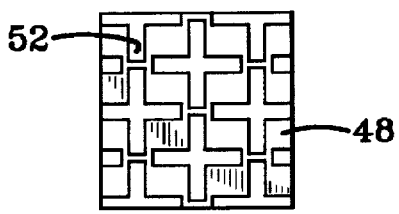
FIG-9
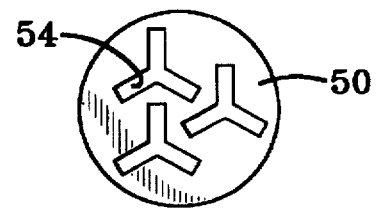
FIG-10
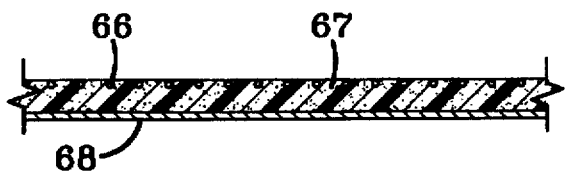
FIG-11
| FIG-12A | FIG-12C |
|---------|---------|
| FIG-12B | FIG-12D |
FIG-12

1

HIGHWAY VEHICLE GUIDANCE SYSTEM

TECHNICAL FIELD

This invention relates generally to a method and apparatus for automated guidance of highway vehicles along a roadway, and more particularly relates to a highway vehicle guidance system using look-ahead radar on the vehicle which receives reflections back from a frequency selective surface formed by an array of antenna elements as a stripe along the highway.

BACKGROUND ART

Automated highway systems utilize sensing and computing equipment to assist operators of motor vehicles in safely and comfortably travelling along a suitably equipped highway. A future automated highway system minimally provides supplemental information to the operator and optimally permits entirely autonomous machine control of each individual truck or automobile without requiring substantial operator intervention. Such an automated system must be capable of detecting roadway obstructions and other traffic, steering the vehicle and controlling its speed, maintaining a safe spacing between vehicles and detecting information such as roadway weather conditions, location for navigational purposes and upcoming highway structures, such as exits.

An extensive variety of automated highway system architectures have been proposed. Several use radar systems which sense obstructions in the forward or side directions, such as other vehicles and guide rails. Radar has the advantage that it is an active system giving all-weather and day or night performance, and has the inherent capability of sensing distance and direction to reflective targets. Radar has also been used for the guidance of airborne ordnance delivery vehicles, such as guided missiles and airplanes. Modern radar scattering technology also allows echo signatures from objects to be interpreted and used for providing additional information. However, within the knowledge of the inventors, a forward-looking radar system has not been developed for highway motor vehicle guidance, i.e. steering.

It is an object and feature of the present invention to provide a highway vehicle guidance system utilizing radar which looks ahead of the vehicle to detect information both for guiding the vehicle along the highway and for detecting prerecorded information about upcoming highway structures and conditions.

BRIEF DISCLOSURE OF INVENTION

The invention is a radar highway vehicle guidance system for use in guiding a land vehicle along a roadway. The invention has a forward looking, lateral position sensing, tracking radar guidance apparatus, such as a monopulse radar system. An elongated stripe is distributed along the roadway in the direction of vehicle travel, preferably longitudinally along the center of a vehicle lane. The stripe comprises a frequency selective surface which generates, as a result of an incident radar signal, a retro-reflective grating lobe at an operating frequency of the tracking radar. The vehicle is automatically steered to follow the stripe.

BRIEF DESCRIPTION OF DRAWINGS

FIG. 5 is a top plan view of a segment of a highway stripe formed as a frequency selective surface for use in embodiments of the present invention.

FIG 6 is a view in vertical section of the stripe segment illustrated in FIG. 5 and taken substantially along the line 6—6 of FIG. 5.

FIGS. 7–10 are top plan views of examples of alternative frequency selected surface structures for use in a highway stripe in connection with embodiments of the present invention.

FIG. 11 is a view in vertical section of an alternative stripe structure having a ground plane.

Figure 1:
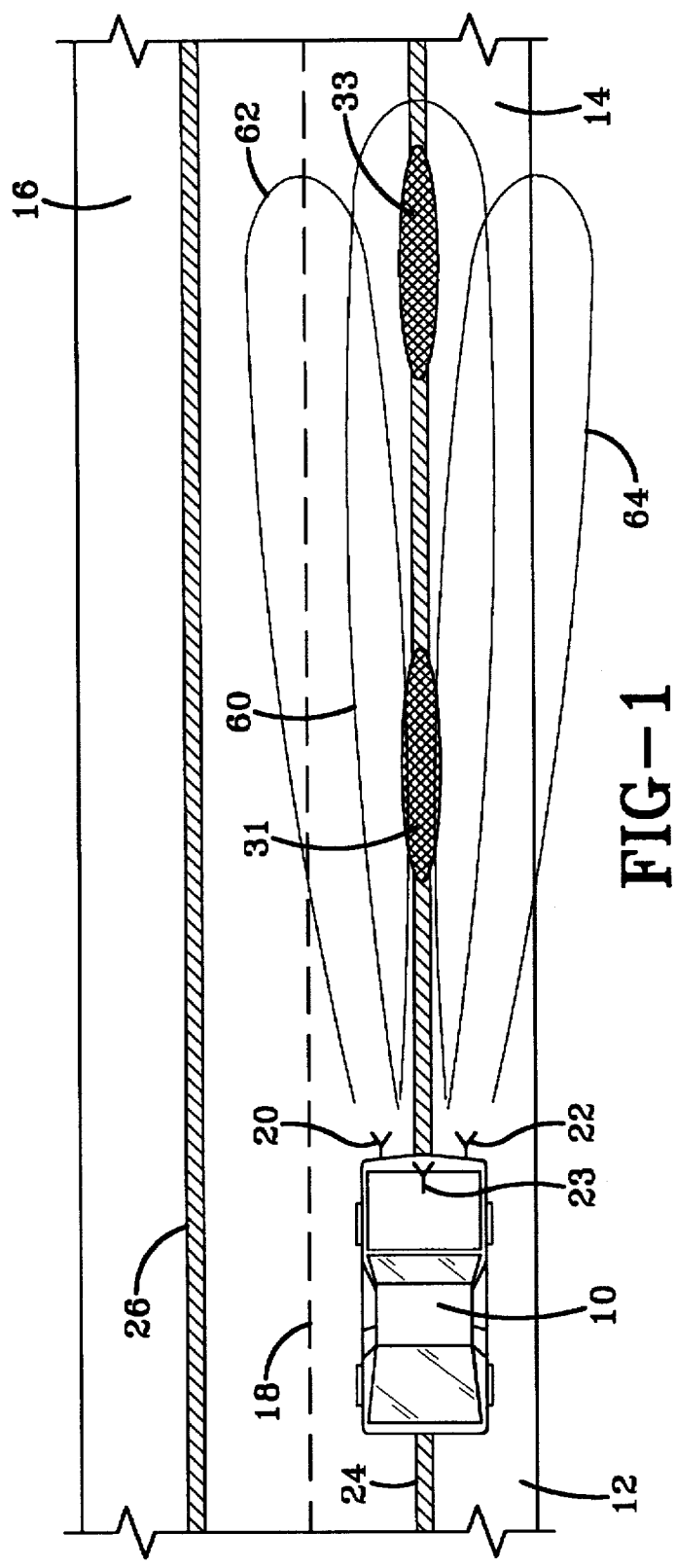
FIG. 1 is a top plan view of a highway vehicle progressing along a roadway utilizing a system embodying the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION

Figure 2:
FIG. 2 is a view in side elevation of the vehicle and highway illustrated in FIG. 1.

FIGS. 1 and 2 illustrate a motor vehicle 10 traversing along a highway 12 having two lanes 14 and 16, divided by a lane marking stripe 18. The vehicle 10 is provided with a forward looking, lateral position sensing, tracking, radar guidance apparatus which includes a pair of antennas 20 and 22 mounted to the front of the vehicle 10. Elongated stripes 24 and 26 are mounted to the surface of the roadway 12 along the center of each traffic lane. The elongated stripes are constructed to provide a frequency selective surface at an operating frequency of the radar system so that the stripes function like a diffraction grating for incident radar radiation. The frequency selective surface generates a retro-reflective grating lobe at an operating frequency of the tracking radar to reflect incident radiation back toward the vehicle and the radar receiver. The radar apparatus has lateral position sensing capability so that the received reflections may be processed to develop signals for steering the vehicle and maintaining it centered about the stripe 24. These fundamental components of the invention may now be described in more detail.

Ordinarily, incident electromagnetic radiation is reflected from a surface in the specular direction. However, a frequency selective surface behaves differently. The electrical characteristics of frequency selective surfaces are known in the prior art although, to the knowledge of the inventors, such surfaces have not been used for guidance purposes. A frequency selective surface is an array of scattering antenna elements arranged in a uniform grid or pattern. The antenna elements can either be conducting elements or slot antenna elements formed in a conductive ground plane. When the element spacing is greater than 0.5 wavelengths, the frequency selective surface operates as a diffraction grating to diffract incident electromagnetic radiation at an angle to the frequency selective surface. The angle of diffraction is a known function of the frequency of the incident wave. Consequently, the surface may be designed so that, at the frequency of the radar, the element spacing of the frequency selective surface produces a grating lobe which is directed back toward the radar system in the vehicle.

The prior art teaches the manner in which the shape and dimensions of a frequency selective surface may be selected and designed in order to obtain desired filter characteristics, frequency and phase response, diffracted lobe angle and center frequency and polarization behavior. The frequency selective surface of the present invention is designed so that a retro-reflected grating lobe, such as lobes 27 and 29 at the operating frequency of the radar is reflected at an angle back toward the vehicle 10 as illustrated in FIG. 2.

Figure 3:
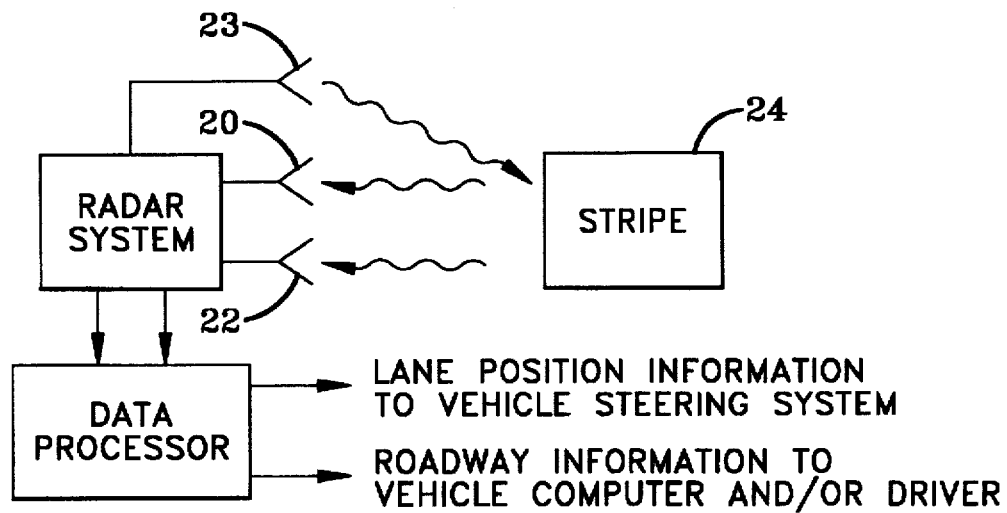
FIG. 3 is a block diagram of a fundamental, radar vehicle guidance apparatus embodying the present invention.

FIG. 3 illustrates the broad concept of the present invention. A radar system is connected to the receiving antennas 20 and 22 and the transmitting antenna 23. Radiation is directed from the transmitting antenna 23 toward the stripe 24 and reflected back to the receiving antennas 20 and 22. The radar system detects the amplitude of the reflected signal at each of the receiving antennas and applies two data streams to the data processor, one representing the amplitude of the echo reflected to the receiving antenna 20 and the other the amplitude of the echo reflected to the receiving antenna 22.

FIGS. 5 and 6 illustrate a segment of a stripe forming a frequency selective surface for use with the present invention. The stripe 24 has a serial array of uniformly spaced, laterally aligned, parallel conductor elements formed by linear pieces of wire 28. The wires 28 are imbedded in a protective, non-conducting, synthetic resin ribbon 30. The wires 28 may, for example, be spaced by a distance of 0.6 inches for X band radar transmission, which is a little more than one-half wavelength. The stripe may then be mounted to the surface of the highway, such as by adhesive bonding, and, if desired, located in a recessed groove. The stripe may be designed, for example, to operate at 20 GHz, and is on the order of 0.15 inches thick and 6 inches wide.

As would be apparent from the above description to those skilled in the art, there is an essentially infinite variety of potential structures and antenna element morphologies which may be utilized in forming a frequency selective surface for use in a highway stripe in embodiments of the invention. The stripe can be formed by laying the wires down on the pavement surface and painting over them with an appropriate, nonconducting material to retain them in position. A conductive material defining the antenna elements for the ground plane of slot antenna elements can be painted upon the highway surface using conductive paint. The elements can be embedded in the pavement or can be formed in the manner of forming conductors on printed circuit boards.

A ground plane may be utilized beneath the antenna elements, such as illustrated in FIG. 11, or multiple layers of antenna elements arrays may be used. While this would increase efficiency and thus increase the strength of the retro-reflected signal, both would also require a stripe of greater thickness and greater cost.

While the frequency selective surface stripe is preferably laid along the center of the lane, it may also be located beside the lane, such as along a curb. Thus, it can be seen that the frequency selective surface requires only a conductive pattern with a regular periodicity along the direction of travel and appropriate dimensions greater than 0.5 wavelength.

The stripe used in the present invention is not confined to a single, continuous stripe. It is only necessary that frequency selective surfaces be distributed along the highway. Consequently, the stripe could be a series of intermittent stripes with spaces between them. Similarly, the stripe could be formed from a series of discrete patches or panels spaced at intervals along the roadway with each patch or panel comprising a substantially uniform series of scattering antenna elements formed of electrically conductive material and dimensioned to diffract an incident radar signal back to the vehicle.

FIGS. 7 and 8 illustrate a few examples of alternative patterns for forming conductive elements 40 and 42 on non-conducting sheet materials 44 and 46. FIGS. 9 and 10 illustrate conductive sheet materials 48 and 50 having a pattern of non-conducting slots 52 and 54 forming slot antenna elements.

FIG. 11 illustrates yet another alternative stripe structure. It has a plurality of parallel wires 66 embedded near a top surface of a nonconducting, synthetic resin sheet 67 and having a conductive ground plane 68 bonded to its underside. The ground plane is spaced from the parallel wires 66. This provides a ground plane for increasing the reflectivity of the stripe. The spacing between the ground plane and the wires is set so that the forward specular lobe off the array of wires is cancelled by the forward reflection from the ground plane. Under most circumstances, this will mean that the spacing from the ground plane to the parallel wires 66 will be near one quarter of a wavelength.

A tracking radar is used on the vehicle to provide guidance input to the vehicle control system. The forward looking, lateral position sensing tracking radar senses the position of the stripe with respect to the central axis of symmetry of the vehicle. The currently preferred radar system is a monopulse radar guidance system which has been conventionally used for missile guidance. This radar transmits a signal in the forward direction and then uses two spaced apart antennas in a phased array to detect the echo. The radar guidance apparatus obtains tracking information by comparing the amplitude and/or phase of the received signals from the two separate antennas. The spacing between the antennas is sufficiently large that the retro-reflection from the frequency selective surface is in the near field of the composite antenna formed by the combination of the two separate antennas. The coherent sum of the signals from the two antennas provides a pattern which is a maximum when the echo is straight ahead along an extension of the center line of the vehicle. The difference signal from the two antennas provides a sharp null when the echo is straight ahead and provides an error signal when the target is not straight ahead. The magnitude of the error signal is an increasing function of the error and has a polarity which indicates the side direction of that error, that is the error distance and direction from between the center line of the vehicle to the center line of the stripe.

FIG. 1 illustrates the center lobe pattern 60 for the coherent sum signal and the individual lobe patterns 62 and 64 for the antennas 20 and 22 which are used to detect the difference or error signal. Since such radar systems are well known in the prior art they are not described here in greater detail.

A separate horn antenna 23 is used for transmitting although one or both receiving antennas may be used for transmitting, as is common in the radar art. The receiving antennas 20 and 22 are a matched pair of antennas mounted side by side in spaced relation. A 180° hybrid is attached to these antennas so that a sum and difference output can be obtained. Consequently, when an echo from the stripe is directly ahead of the receiving antenna pair, the sum signal is maximum and a very sharp null is observed in the difference signal because the antennas receive identical signals from the stripe which cancel out in the difference process. Lateral variation of the vehicle from this center position causes a reduction in the sum signal and an increase in the difference signal which is a function of the lateral distance of that error. Consequently, these signals can be applied to the steering control of the vehicle in the conventional manner.

As known to those skilled in the radar art, the term "monopulse" encompasses a wide variety of related tracking radar techniques. These include monopulse tracking apparatus which utilize amplitude comparison, phase comparison, sector scan tracking, and sequential lobe tracking.

The vehicle guidance system of the present invention permits several enhancements for improving its effectiveness. The angle of the retro-reflected lobes is a function of only the radar frequency and the inter-element spacing in the frequency selective surface. Variations in the transmitted frequency therefore provide variations in the distance ahead to the region of the stripe from which retro-reflections are received back at the vehicle. Consequently, referring to FIG. 2, reflection from lobes 27 and 29 received at the vehicle are reflections of different frequency signals which are retro-reflected at different angles with the pavement 12 and consequently are received by the receiving antennas from regions 31 and 33 which are spaced two different distances ahead of the vehicle 10. To accomplish this, the transmitted radar signal will have a sufficiently broad bandwidth to encompass the two frequencies in order to obtain reflections from the two desired regions 31 and 33. A chirp radar system is particularly advantageous for this purpose, with the chirp radar pulses including the two appropriate frequencies. Typically, the transmitted radar signal will have a frequency bandwidth of approximately 10% so that the signal from the highway stripe can be received and identified by either linear or non-linear processing. In this manner two different sets of sum and difference signals reflected from two different regions ahead of the vehicle may be separately detected. The signal from the nearer region 31 provides an indication of the present lateral position of the vehicle for more precise tracking and the signal from the more distant region 38 provides a preview for anticipating direction changes. For example, the near region 31 may be spaced 10 feet ahead of the vehicle, while the more distant region 33 may be 50 feet or more ahead of the vehicle.

It is also desirable to provide enhancements to assist in the discrimination of reflections coming from desired targets, from reflections from other objects, and from transmissions from other radar transmitters. Thus, to improve such discrimination and minimize intervehicle system interference, it is desirable that the transmitted radar signal have some signature properties so that in the midst of all other returned signals received by the radar, it can be identified as the one to provide the guidance input. One manner of accomplishing this is to transmit the radar with a pseudo random code so that reflections from the vehicle's transmitted energy can be discriminated from other radar signals coming from other vehicles by conventional correlation processing such as is conventionally done with other radar techniques. Additionally, since the polarization of the retro-reflected waves is determined by the design of the frequency selective surface, in a manner known to those skilled in the art, discrimination of reflections coming from the stripe from reflections from other objects may be improved by matching the receiving antenna polarization to the stripe polarization. For example, the frequency selective surface may be designed to convert linear polarization to circular polarization or to convert horizontal polarization to vertical polarization. This capability can be used in the chirp radar to isolate the transmit and receiving antennas as well as to reduce the background clutter.

As yet a further enhancement, the physical morphology, such as shape and/or dimensions, of the frequency selective surface may be varied to modulate the incident radar waves so that the modulated echoes carry encoded information which is detected in the vehicle receiver. Thus, since polarization and frequency response are controllable design parameters which are a function of the size, shape and orientation of the antenna elements, the polarization, frequency response and amplitude of the reflected signals can be made to vary spatially along the stripe. Such variations in the size, shape and orientation of the antenna elements modulates in incident radar signal in a manner conveying information which is detected in the radar receiving system and applied to the control system or displayed to the driver. This information would include, for example, roadway related information, such as vehicle speed limits and upcoming curves, exits or towns. Modulation can be digital or analog or bar code type. Digital modulation is preferred, which may be in the form of switching two frequencies or switching polarizations in order to improve signal to noise ratio.

Figure 4:
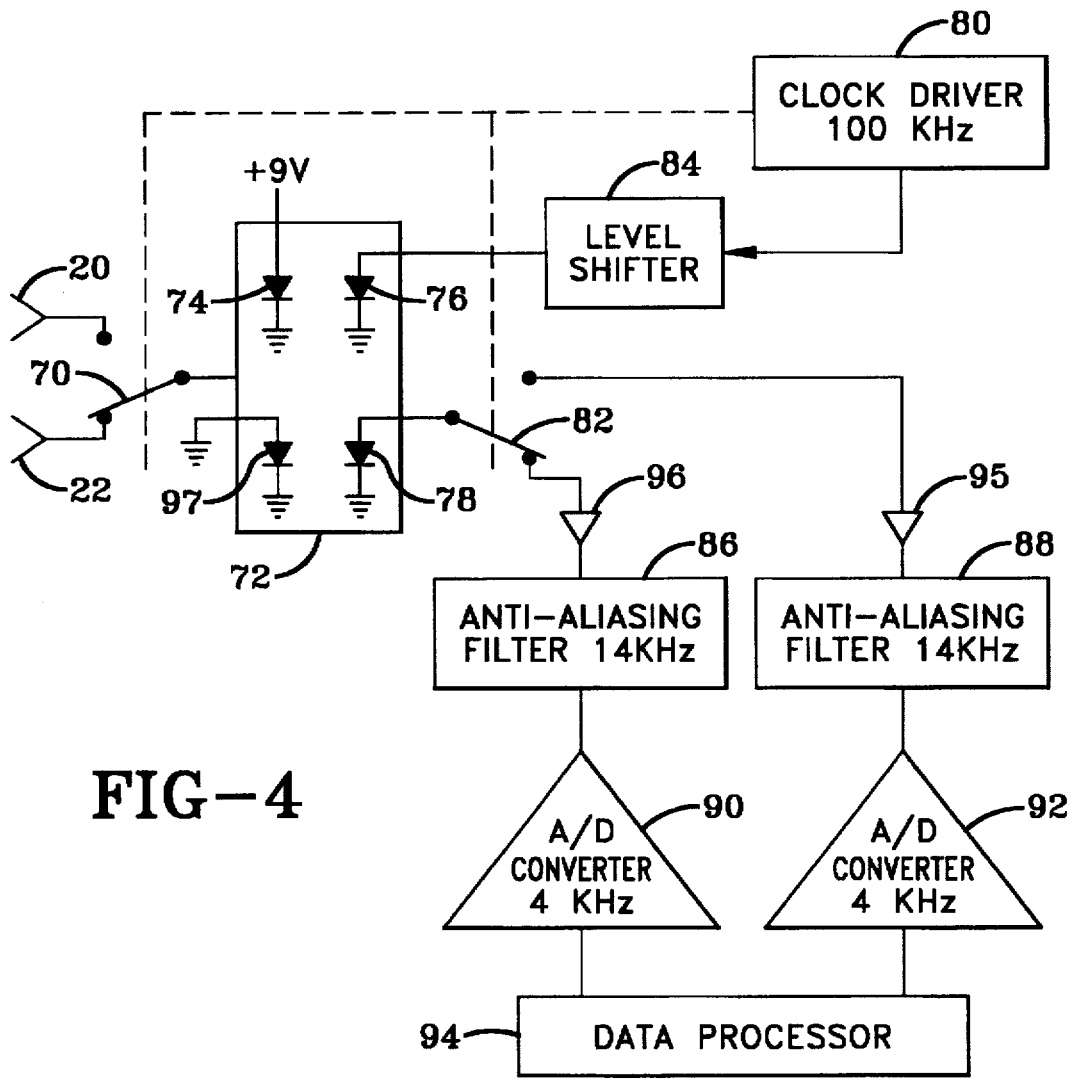
FIG. 4 is a more detailed block diagram of the preferred embodiment.
Figure 12A:
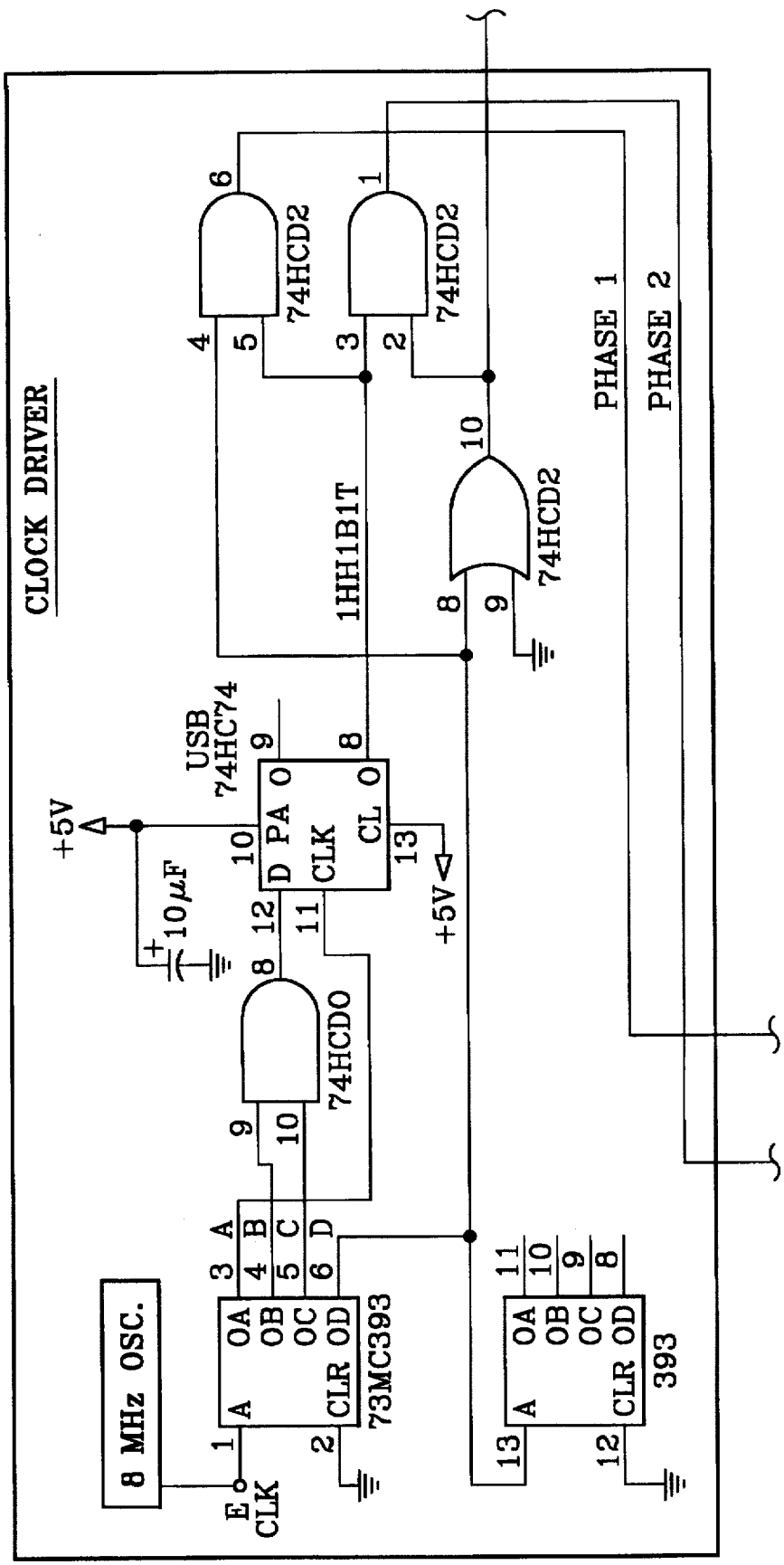
FIG. 12 is a schematic diagram of the currently preferred embodiment of the invention.
Figure 12B:
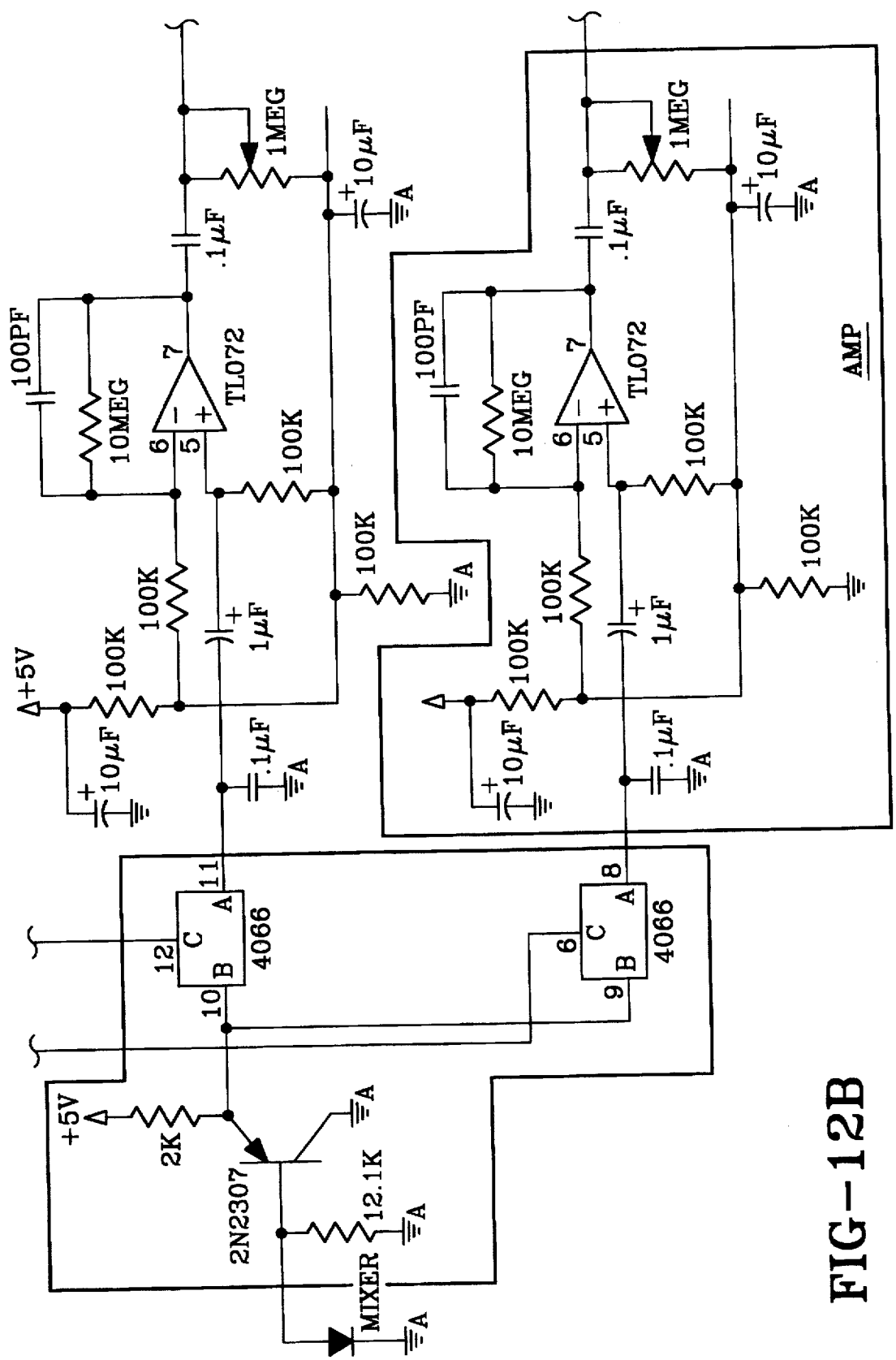
Figure 12C:
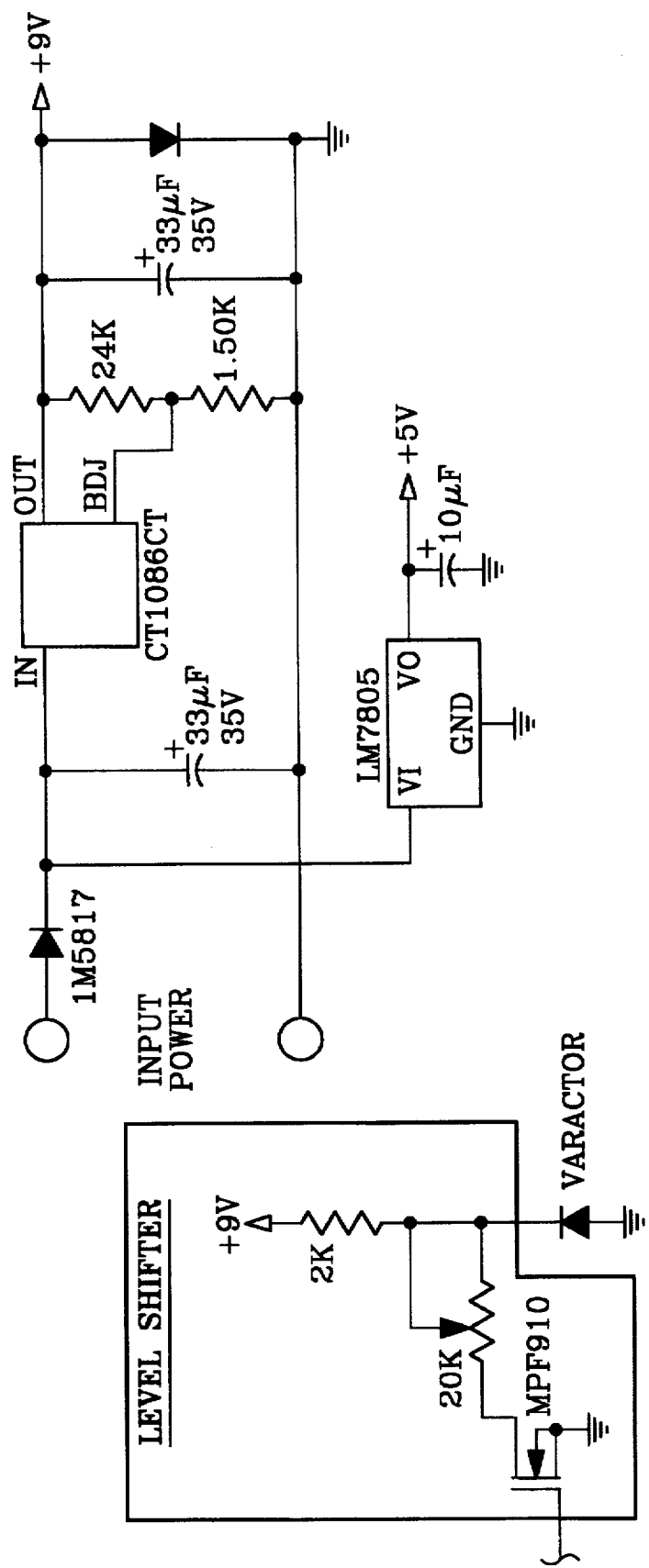
Figure 12D:
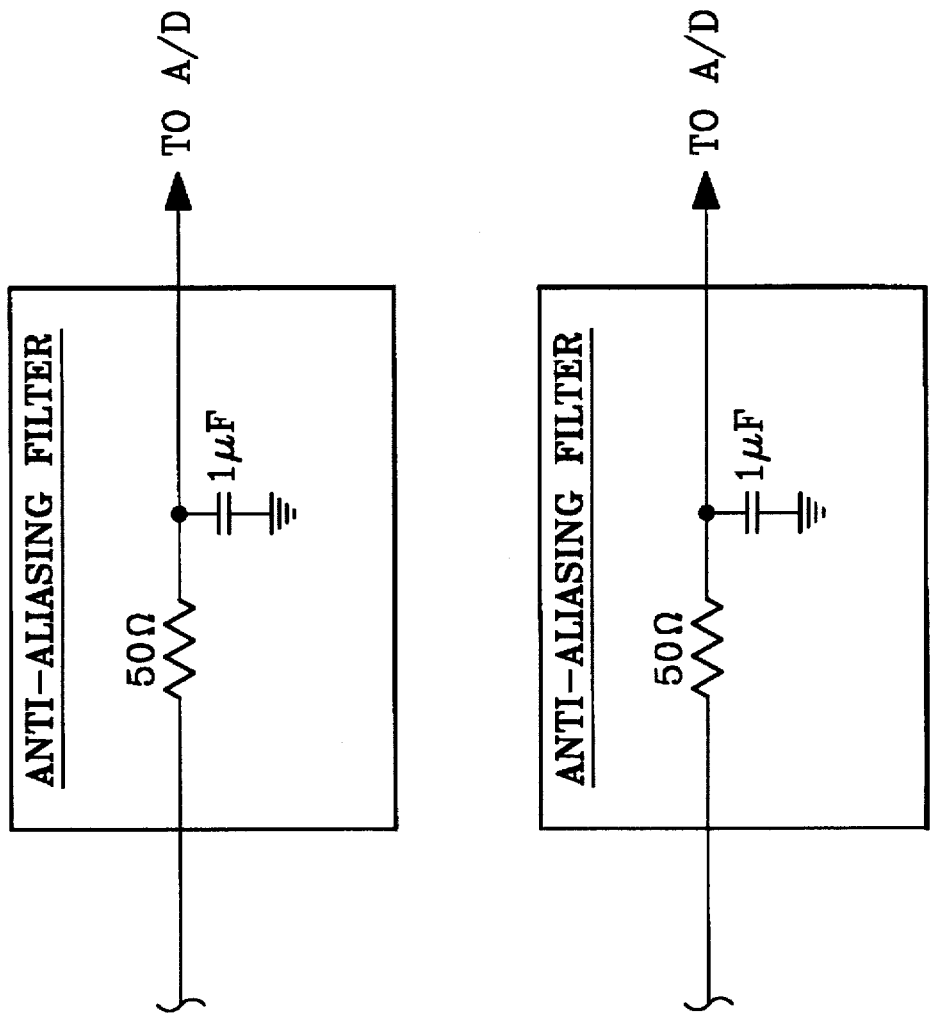

FIG. 4 is a block diagram illustrating the experimental embodiment in more detail. The receiving antennas 20 and 22 are connected through a single pole, double throw PIN diode switch 70 to an RF assembly 72. The RF assembly is a commercially purchased Alpha GOS2562-98. It is essentially a resonant, microwave cavity having four diodes, 74, 76, 78 and 97. Diode 97 was in the unit but was connected to ground to electrically remove it from the circuit. The diode 74 is a Gunn diode for energizing the resonant cavity at its resonant frequency of, for example, 10.5 GHz, as a result of the application of a 9 volt power source to the diode 74. A clock driver 80 alternately switches the switch 70 and a second single pole, double throw switch 82, and also drives a level shifter 84. The level shifter 84 switches the capacitance of the varactor diode 76 to switch the cavity resonant frequency between the radar transmission frequency of 10.5 GHz and a local oscillator frequency which is 10 KHz above the transmission frequency. The switches 70 and 82 are synchronously switched so that a radar burst is transmitted from one of the two antennas and its reflection is returned to that antenna and frequency translated by the local oscillator frequency to an intermediate frequency applied to one of the two anti-aliasing filters 86 and 88 by amplifiers 95 and 96. Two signals result, one from each of the two receiving antennas 20 and 22. These analog signals are converted to digital form by conventional sampling techniques in A/D converters 90 and 92 and applied to the data processor 94. Thus, two streams of data are applied to the data processor 94, one representing the amplitude of the echo reflected from the stripe to one antenna and the other representing the amplitude of the echo reflected from the stripe to the other antenna. Conventional data processing algorithms are then utilized to obtain tracking information by comparing the amplitude of these two signals.

Therefore, it can be seen that one advantage of the present highway motor vehicle guidance system is that it looks ahead of the vehicle enabling anticipation of the conditions the vehicle will encounter, thus allowing a time interval for the vehicle to adapt to highway conditions to allow smoother steering inputs and more gradual, smooth variations in steering and improved safety. Furthermore, the radar system of the present invention may be adapted to be simultaneously used for the radar methods already proposed for purposes of collision avoidance or sensing of obstructions, allowing the same antennas and microwave hardware to be used for all functions.

FIG. 11 is a detailed schematic diagram illustrating the currently preferred embodiment of the invention.

While certain preferred embodiments of the present invention have been disclosed in detail, it is to be understood that various modifications may be adopted without departing from the spirit of the invention or scope of the following claims.

We claim:

1. A radar vehicle guidance apparatus for use in guiding a land vehicle along a roadway and comprising:
   (a) a forward looking, lateral position sensing, tracking radar guidance apparatus mounted to the vehicle wherein the radar radiates and detects at least two frequencies, the two frequencies being selected to generate a retro-reflected grating lobe at two angles above the roadway and corresponding to two different distances from the vehicle; and
   (b) an elongated stripe distributed along the roadway in the direction of vehicle travel, the stripe comprising substantially laterally aligned antenna elements substantially uniformly spaced at least one-half the wavelength of the radar frequency, formed of electrically conductive material and spaced to provide a frequency selective surface generating retro-reflective, non-specular grating lobes at the operating frequencies of the tracking radar.

2. An apparatus in accordance with claim 1 wherein the radar guidance apparatus comprises a monopulse radar guidance apparatus.

3. An apparatus in accordance with claim 1 wherein the radar apparatus comprises a chirp radar transmitting pulses across a frequency band including said two frequencies.

4. An apparatus in accordance with claim 1 wherein polarization, frequency response and grating lobe angle parameters of the stripe are determined by the size, shape and orientation of said antenna elements, wherein at least one of said parameters is spatially varied along the stripe to modulate incident radar waves and generate waves reflected from the stripe containing roadway related information, and wherein the radar includes a detector for demodulating the reflected signals.

5. An apparatus in accordance with claim 1 wherein the radar has a transmitter which modulates the transmitted radar pulses with a selected pseudo-random code and also has a receiver which discriminates the reflections from said transmitter using correlation techniques.

6. An apparatus in accordance with claim 1 wherein said elements are covered by a weather resistant protective synthetic resin.

7. An apparatus in accordance with claim 1 wherein a ground plane is spaced below said elements for increasing the reflectivity of said stripe.

8. An apparatus in accordance with claim 1 wherein said stripe comprises a series of parallel, substantially equidistantly spaced wires spaced in excess of one half wavelength of said radar operating frequency and less than one wavelength.

9. An apparatus in accordance with claim 1 wherein the antenna elements comprise a series of spaced conductor elements.

10. An apparatus in accordance with claim 1 wherein the antenna elements comprise a conductive sheet material having a pattern of non-conducting slots forming slot antenna elements.

11. A method for guiding a vehicle along a roadway comprising:
   directing radar waves at a radar frequency toward the roadway and radar tracking and steering the vehicle to follow retro-reflections from an elongated frequency selective surface formed as a stripe along a roadway by a series of substantially laterally aligned antenna elements formed by a conductive material with substantially uniform spacings between the elements at least one-half wavelength of the radar frequency to generate retro-reflective, non-specular grating lobes from incident radar waves, the radar tracking comprising radiating radar waves at a plurality of frequencies which generate retro-reflecting grating lobes reflected from said stripe at different angles above the roadway, and detecting the waves at said different frequencies corresponding to different distances from the vehicle.

12. A method in accordance with claim 11 and further comprising varying the physical configuration of said elements in a pattern modulating an incident radar wave from a moving vehicle with roadway related information and demodulating the information in a receiver circuit mounted to the vehicle.

13. A method in accordance with claim 11 and further comprising modulating radiated radar waves with a pseudo-random code and discriminating reflected waves by cross correlation.

* * * * *